US012704016B2

(12) United States Patent
Tao et al.

(10) Patent No.: US 12,704,016 B2
(45) Date of Patent: Aug. 11, 2026

(54) ELECTRIC TAILGATE STRUT FOR AUTOMOBILES

(71) Applicant: Changzhou Weien Technology Development Co., Ltd, Changzhou (CN)

(72) Inventors: Zhiwen Tao, Changzhou (CN); Xiaogang Li, Changzhou (CN)

(73) Assignee: CHANGZHOU WEIEN TECHNOLOGY DEVELOPMENT CO., LTD, Changzhou (CN)

( * ) Notice: Subject to any disclaimer, the term of this patent is extended or adjusted under 35 U.S.C. 154(b) by 0 days.

(21) Appl. No.: 19/006,286

(22) Filed: Dec. 31, 2024

(65) Prior Publication Data

US 2025/0263964 A1 Aug. 21, 2025

(30) Foreign Application Priority Data

Feb. 20, 2024 (CN) ........................ 202420308403.1

(51) Int. Cl.

*E05F 15/622* (2015.01)
*B62D 33/027* (2006.01)
*E05F 1/10* (2006.01)

(52) U.S. Cl.

CPC .......... *E05F 15/622* (2015.01); *B62D 33/027* (2013.01); *E05F 1/1091* (2013.01); *E05Y 2201/478* (2013.01); *E05Y 2201/696* (2013.01); *E05Y 2900/546* (2013.01)

(58) Field of Classification Search

CPC ................ E05F 15/622; E05F 1/1091; E05Y 2900/546; E05Y 2201/478; E05Y 2201/696; F16H 25/20; Y10T 74/18576

See application file for complete search history.

(56) References Cited

U.S. PATENT DOCUMENTS

| | | | | |
|---|---|---|---|---|
| 5,067,739 | A * | 11/1991 | Kuan | B62H 1/06 280/304 |
| 7,416,237 | B1 * | 8/2008 | Kachouch | F16F 9/56 277/928 |
| 7,648,189 | B2 * | 1/2010 | Porat | E05F 1/1091 49/343 |
| 9,689,188 | B2 * | 6/2017 | Fischer | F16H 25/2418 |
| 10,100,568 | B2 * | 10/2018 | Scheuring | E05F 15/622 |
| 10,280,674 | B2 * | 5/2019 | Leonard | E05F 1/1041 |

(Continued)

*Primary Examiner* — Justin B Rephann

(74) *Attorney, Agent, or Firm* — Bayramoglu Law Offices LLC

(57) ABSTRACT

An electric tailgate strut for automobiles includes telescopic rod, gas spring, nut and driving unit. Telescopic rod includes outer tube and inner tube, wherein the outer tube can move along the axial direction of inner tube. Gas spring is arranged inside the telescopic rod and is included of thread tube, piston and piston rod, wherein distance between piston rod and inner tube remains constant, wherein piston is located at the free end of piston rod and in the sliding seat with inner wall of thread tube, wherein seal guide assembly is provided between piston rod and thread tube. Driving unit serves to drive thread tube in the rotation. Thread tube is driven to rotate by motor, so that outer tube can move along axial direction of inner tube to achieve rise or fall of strut. Thread tube itself, piston rod and piston form a gas spring.

15 Claims, 8 Drawing Sheets

(56) References Cited

U.S. PATENT DOCUMENTS

| | | | | |
|---|---|---|---|---|
| 2007/0261310 | A1* | 11/2007 | Porat | E05F 1/1091 49/343 |
| 2007/0296243 | A1* | 12/2007 | Borrmann | E05F 15/622 296/146.4 |
| 2009/0044645 | A1* | 2/2009 | Buescher | F16H 25/20 74/89.34 |
| 2010/0077666 | A1* | 4/2010 | Porat | E05F 15/622 49/343 |
| 2014/0298933 | A1* | 10/2014 | Kohlmeyer | F16H 25/20 74/89.32 |
| 2017/0175859 | A1* | 6/2017 | Brockmeier | F16H 25/2056 |
| 2022/0259019 | A1* | 8/2022 | Lu | B66F 3/20 |
| 2022/0282544 | A1* | 9/2022 | Von Der Wehd | E05F 15/622 |
| 2023/0184018 | A1* | 6/2023 | Gutgesell | E05F 15/622 49/324 |
| 2024/0060528 | A1* | 2/2024 | Bals | E05F 1/105 |

* cited by examiner

ELECTRIC TAILGATE STRUT FOR AUTOMOBILES

CROSS REFERENCE TO THE RELATED APPLICATIONS

This application is based upon and claims priority to Chinese Patent Application No. 202420308403.1, filed on Feb. 20, 2024, the entire contents of which are incorporated herein by reference.

TECHNICAL FIELD

The present invention relates to technical field of the tailgate strut, especially to the electric tailgate strut for automobiles.

BACKGROUND

The tailgate opening and closing system for automobiles is generally divided into two types, namely electric system as well as manual system. The electric tailgate opening and closing system for automobiles can be further divided into two configuration schemes, one is to install two electric struts (PR, a product that is extended and compressed by motor-driven screw actuator) on left and right sides of tailgate, which is PR+PR, the other is to install an electric strut (PR) and a pneumatic balance strut (FEBI, a product with the appearance of an electric strut and a traditional gas spring inside) on left and right sides of tailgate, which is PR+FEBI.

Since traditional electric struts generally do not possess the damp construction when using PR+PR configuration scheme, tailgate is prone to shake during rising or falling process of electric strut, affecting the experience of user negatively. When using PR+FEBI configuration scheme, the smoothness of tailgate when opening or closing is greatly improved. However, for heavy vehicles with large tailgate mass such as off-road vehicles, the power may not be sufficient when a single electric strut is used.

SUMMARY

To solve problems existing in prior art, the present invention proposes the electric tailgate strut for automobiles.

To achieve above-mentioned purpose, the present invention adopts the following technical solutions:

The electric tailgate strut for automobiles, including telescopic rod, which includes outer tube and inner tube, wherein the outer tube can move along the axial direction of inner tube, gas spring, which is arranged inside the telescopic rod and is included of thread tube with thread on outer wall, piston and piston rod, wherein distance between piston rod as well as inner tube remains constant, wherein piston is located at the free end of piston rod and in the sliding seat with inner wall of thread tube, wherein seal guide assembly is provided between piston rod as well as thread tube, nut, which is adapted to thread tube and is located at the end of inner tube, driving unit, which is fixedly arranged in outer tube and serves to drive thread tube in the rotation so that thread tube drives outer tube to move along axial direction of inner tube, and tailgate connection assembly, which is located at both ends of telescopic rod and is used for connection between telescopic rod and tailgate.

Preferably, there is no self-locking between the nut and the thread tube.

Preferably, the nut serves to limit the circumferential position of telescopic rod so that the circumferential movement between outer tube and inner tube is impossible, wherein inner wall of outer tube is provided with first grooves evenly distributed along its axis, wherein outer wall of inner tube is provided with second grooves evenly distributed along its axis, and wherein outer wall of nut is provided with first convex strip, which is adapted to first groove, and second convex strip, which is adapted to second groove.

Preferably, the driving unit includes motor, gear box and controller, wherein output end of motor drives thread tube for rotation through gear box.

Preferably, the end of inner tube is provided with the inner tube plug, which is connected to the end of piston rod, wherein the side wall of inner tube plug is firmly connected to the inner wall of inner tube.

Preferably, third convex strip is arranged on side wall of inner tube plug, which is adapted to second groove.

Preferably, outer tube plug is firmly installed at the end of outer tube, wherein power lead hole is preset on end or side of outer tube plug, and wherein fourth convex strip is arranged on side wall of outer tube plug, which is adapted to first groove.

Preferably, the seal guide assembly includes spacer sleeve, oil seal and rear upper sleeve, wherein oil seal is located between spacer sleeve and rear upper sleeve, and wherein the rear upper sleeve is fixedly connected to the end of thread tube.

Preferably, tailgate connection assembly is a ball socket or ball head, wherein connection assembly at least at one end of telescopic rod can rotate in the circumferential direction.

Preferably, it further includes protective cover, which includes an outer tube protective cover arranged at the end of the outer tube and an inner tube protective cover arranged at the end of the inner tube.

The beneficial effects of the present invention are as follows:

1. In present electric tailgate strut for automobiles, thread tube is driven to rotate by motor, so that outer tube can move along axial direction of inner tube to achieve rise or fall of strut. Thread tube itself, piston rod and piston form a gas spring, which effectively improves the smoothness of tailgate when opening or closing. On the other hand, when the electric tailgate strut for automobiles is extended, gas spring has a certain output force, which can reduce the load of motor and increase the thrust under the same conditions.
2. In present electric tailgate strut for automobiles, thread tube, piston rod as well as piston form non-lockable gas spring. By controlling the rotation of motors, the rotation of thread tube can be limited, and gas spring can be automatically locked, which improves stability of electric tailgate strut for automobiles.
3. Protective covers are provided at the ends of outer tube and inner tube, which can play a role in waterproofing and dustproofing.

Among them: 1. Outer tube; 2. Inner tube; 3. Thread tube; 4. Motor; 5. Gear box; 6. Double-ear back plug; 7. Nut; 8. Piston; 9. Piston rod; 10. Spacer sleeve; 11. Oil seal; 12. Rear upper sleeve; 13. Inner tube plug; 14. Bearing; 15. Plugged cover of tube plug; 16. Outer tube protective cover; 17. First ball socket; 18. Outer tube plug; 19. Inner tube protective cover; 20. Pin shaft; 101. First groove; 201. Second groove; 701. First convex strip; 702. Second convex strip; 131. Third convex strip; 132. Second ball socket; 181. Fourth convex strip.

DETAILED DESCRIPTION OF THE EMBODIMENTS

The technical solution in embodiments of present invention will be clearly and completely described below in combination with the attached drawings in embodiment of present invention. Obviously, the embodiments described are only part of the embodiments of the present invention, not all embodiments.

Figure 1:
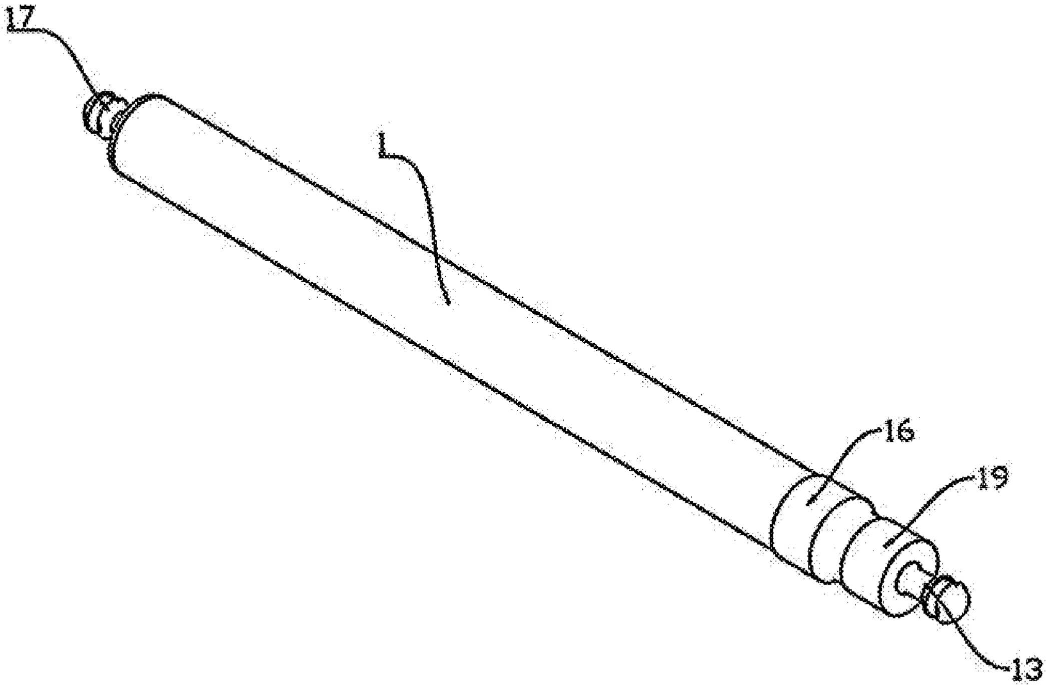
FIG. 1 shows a schematic diagram of the three-dimensional structure related to the electric tailgate strut for automobiles of the present invention.
Figure 2:
FIG. 2 shows a schematic diagram of the front view related to the electric tailgate strut for automobiles of the present invention.
Figure 3:
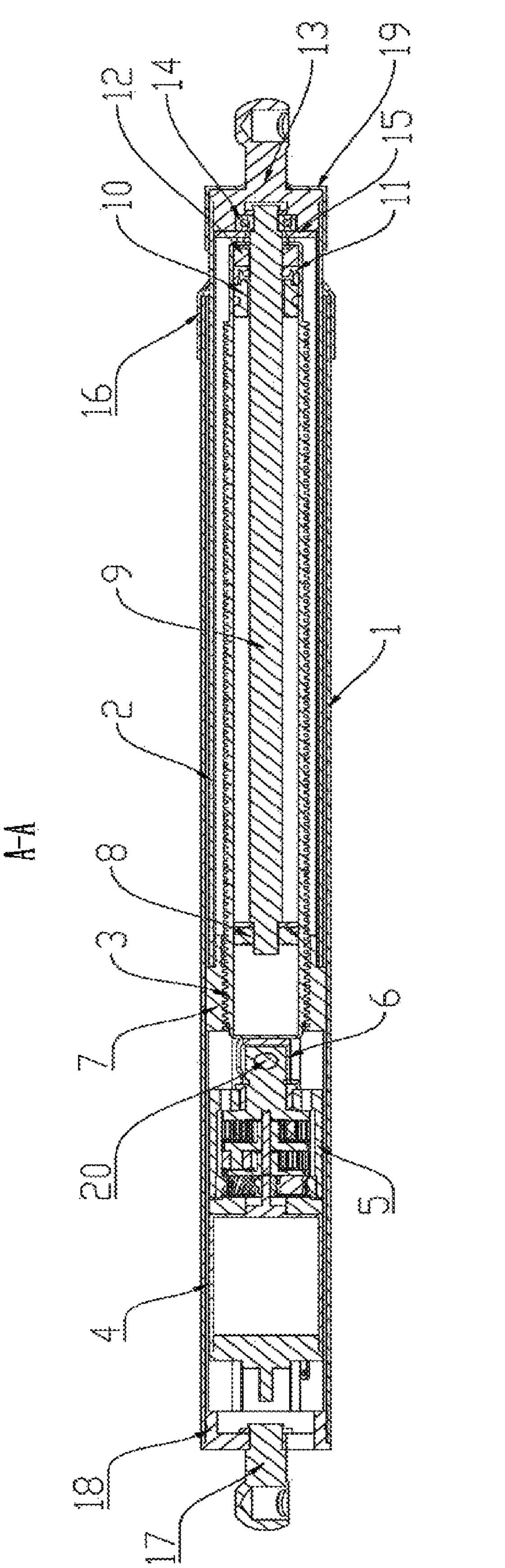
FIG. 3 shows a schematic cross-sectional view related to A-A section of FIG. 2 of electric tailgate strut for automobiles of the present invention.
Figure 4:
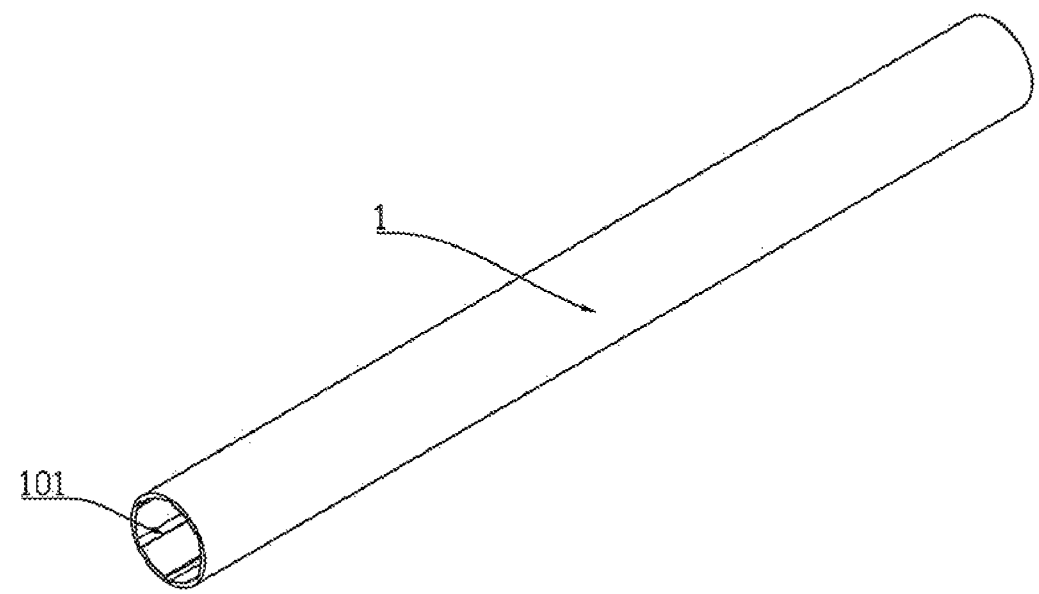
FIG. 4 shows a schematic diagram of the three-dimensional structure related to outer tube of the electric tailgate strut for automobiles of the present invention.
Figure 5:
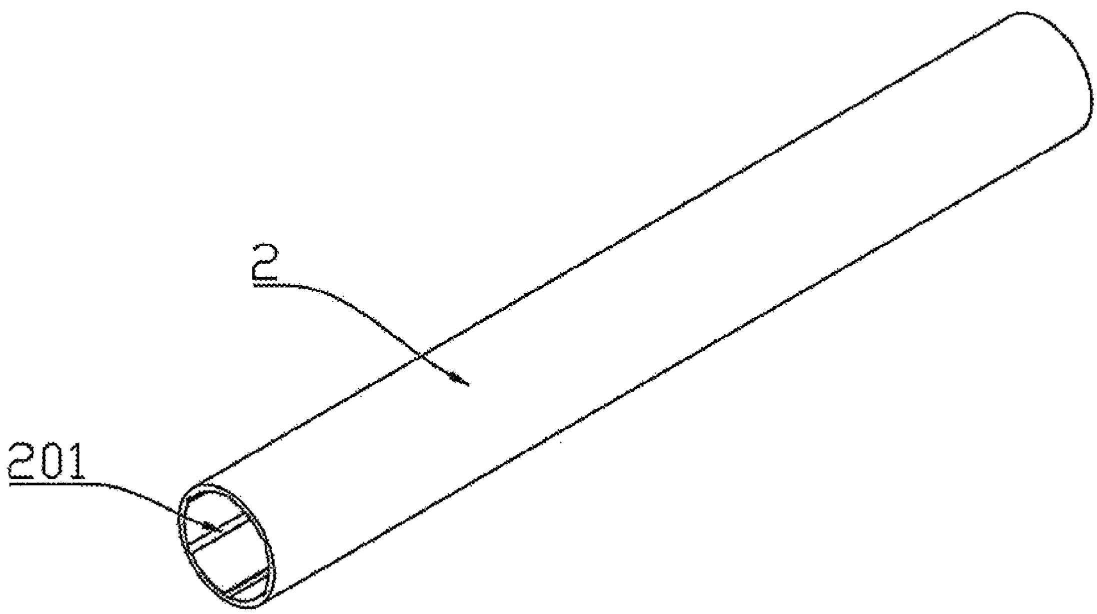
FIG. 5 shows a schematic diagram of the three-dimensional structure related to inner tube of the electric tailgate strut for automobiles of the present invention.
Figure 6:
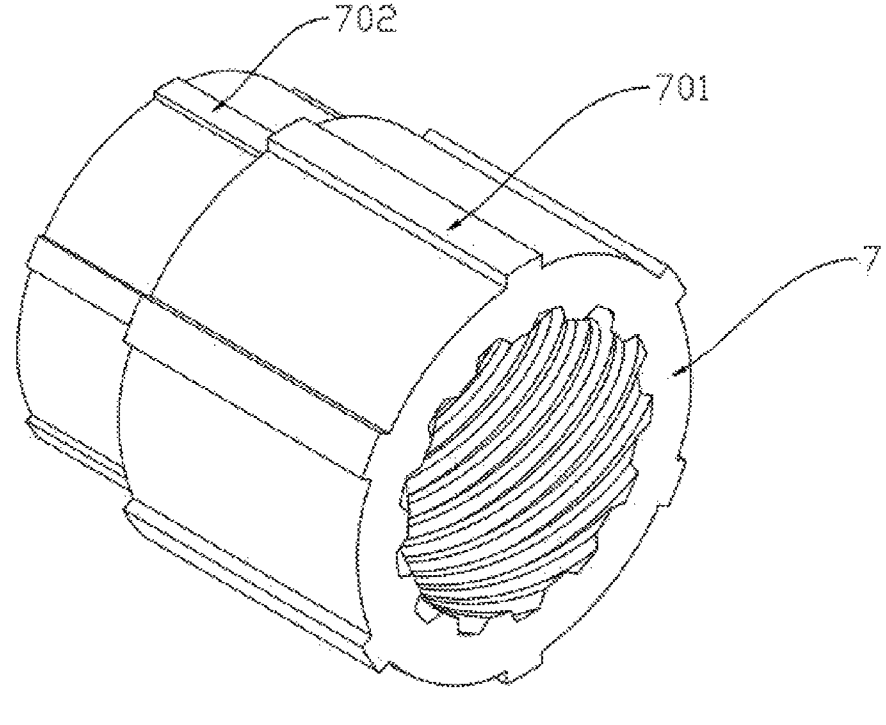
FIG. 6 shows a schematic diagram of the three-dimensional structure related to the nut of electric tailgate strut for automobiles of the present invention.
Figure 7:
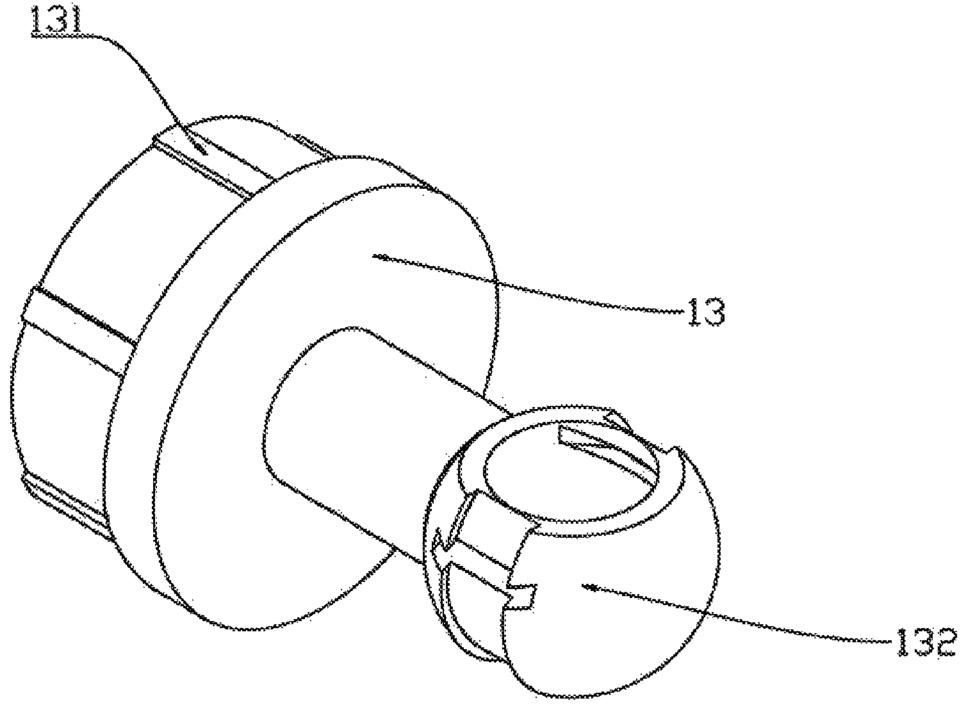
FIG. 7 shows a schematic diagram of the three-dimensional structure related to the inner tube plug of the electric tailgate strut for automobiles of the present invention.
Figure 8:
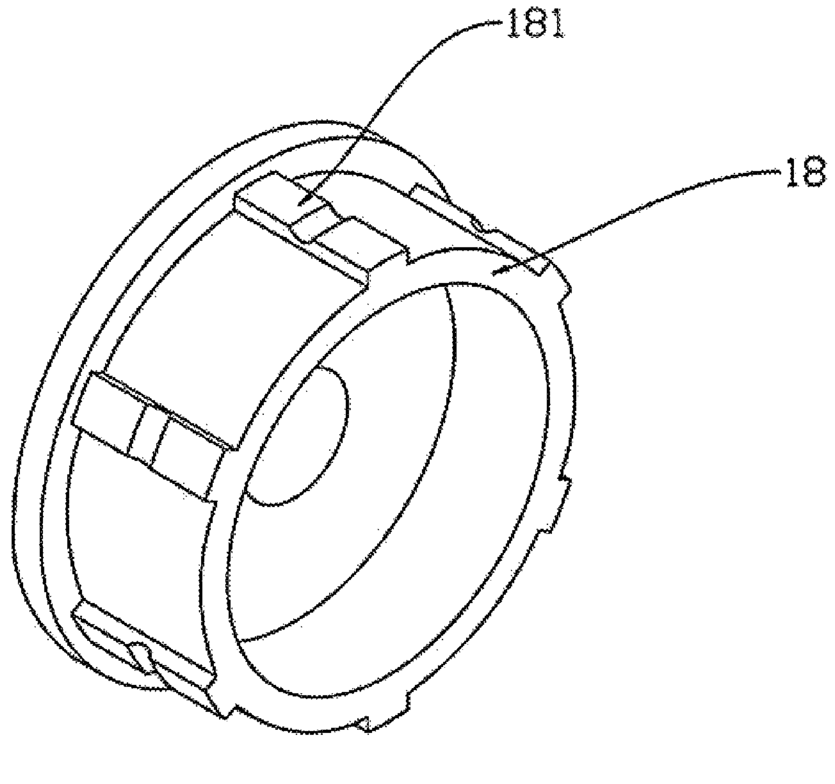
FIG. 8 shows a schematic diagram of the three-dimensional structure related to the outer tube plug of the electric tailgate strut for automobiles of the present invention.

Referring to FIGS. 1 to 8, the electric tailgate strut for automobiles includes:

- telescopic rod, which includes outer tube 1 as well as inner tube 2, wherein outer tube 1 can move along the axial direction of inner tube 2,
- gas spring, which is arranged inside the telescopic rod and is included of thread tube 3 with thread on outer wall, piston 8 and piston rod 9, wherein distance between piston rod 9 as well as inner tube 2 remains constant, wherein piston 8 is located at the free end of piston rod 9 and in the sliding seat with inner wall of thread tube 3, wherein seal guide assembly is provided between piston rod 9 as well as thread tube 3,
- nut 7, which is adapted to thread tube 3 and is located at the end of inner tube 2,
- driving unit, which is fixedly arranged in outer tube 1 and serves to drive thread tube 3 in the rotation so that thread tube 3 drives outer tube 1 to move along axial direction of inner tube 2, and
- tailgate connection assembly, which is located at both ends of telescopic rod and is used for connection between telescopic rod and tailgate.

The nut 7 serves to limit circumferential position of telescopic rod so that circumferential movement between outer tube 1 and inner tube 2 is impossible, wherein

- the inner wall of outer tube 1 is provided with first grooves 101 evenly distributed along its axis, wherein outer wall of inner tube 2 is provided with second grooves 201 evenly distributed along its axis, and wherein outer wall of nut 7 is provided with first convex strip 701, which is adapted to first groove 101, and second convex strip 702, which is adapted to second groove 201.

Driving unit includes motor 4, gear box 5 and controller. Output end of motor 4 drives thread tube 3 to rotate through the gear box 5. Gear box 5 is planetary reduction gear box, and the controller is Hall encoder or other signal feedback unit. The end of thread tube 3 is equipped with double-ear back plug 6. The double-ear back plug 6 is connected to output shaft of gear box 5 by pin shaft 20. Output end of gear box 5 can also be connected to the end of thread tube 3 by coupling.

The end of inner tube 2 is provided with inner tube plug 13, which is connected to the end of piston rod 9, wherein side wall of inner tube plug 13 is firmly connected to inner wall of inner tube 2. Between inner tube plug 13 and piston rod 9, bearing 14 is installed. Plugged cover of tube plug 15 for axially limiting the bearing 14 is also fixedly mounted on inner tube plug 13.

Third convex strip 131 is arranged on side wall of inner tube plug 13, which is adapted to second groove 201.

Second groove 201 cooperates with the third convex strip 131 to limit the circumferential movement of inner tube plug 13.

Outer tube plug 18 is firmly installed at end of outer tube 1, wherein fourth convex strip 181 is arranged on side wall of outer tube plug 18, which is adapted to first groove 101.

The seal guide assembly includes spacer sleeve 10, oil seal 11 and rear upper sleeve 12, wherein oil seal 11 is located between spacer sleeve 10 and rear upper sleeve 12, and wherein the rear upper sleeve 12 is fixedly connected to the end of thread tube 3.

The tailgate connection assembly is ball socket or ball head, wherein connection assembly at least at one end of telescopic rod can rotate in the circumferential direction.

When the tailgate connection assembly is ball socket, it includes the first ball socket 17, connected to outer tube plug 18 as well as the second ball socket 132 connected to inner tube plug 13. The ball socket is rotatable in circumferential direction at least at one end of telescopic rod.

It further includes the protective cover, which includes outer tube protective cover 16 arranged at the end of outer tube 1 and inner tube protective cover 19 arranged at the end of inner tube 2. Outer tube protective cover 16 is provided at both ends of the outer tube 1.

In present electric tailgate strut for automobiles, thread tube 3 is driven to rotate by motor 4, so that outer tube 1 can move along axial direction of inner tube 2 to achieve rise or fall of strut. Thread tube 3 itself, piston rod 9 and piston 8 form a gas spring, which effectively improves the smoothness of tailgate when opening or closing. On the other hand, when the electric tailgate strut for automobiles is extended, gas spring has a certain output force, which can reduce load of motor 4 and increase the thrust under the same conditions.

In present electric tailgate strut for automobiles, thread tube 3, piston rod 9 and piston 8 form non-lockable gas spring. By controlling the rotation of motor 4, the rotation of thread tube 3 can be limited, and gas spring can be automatically locked, which improves the stability of electric tailgate strut for automobiles.

Protective covers are provided at the ends of outer tube 1 and inner tube 2, which can play a role in waterproofing and dustproofing.

The above content is only a preferred embodiment of the present invention. For ordinary technicians in the art, the changes are obtained based on the exemplary embodiment and applying scope according to the idea of the present invention, the content of the specification should not be understood as a limitation of the present invention. Any modifications, improvements, equivalent replacements and the like, made within the spirit as well as principle of the present invention, shall all be included in the protection scope of the present invention.

What is claimed is:

1. An electric tailgate strut for automobiles, comprising a telescopic rod, wherein the telescopic rod comprises an outer tube and an inner tube, wherein the outer tube is allowed to move along an axial direction of the inner tube, a gas spring, wherein the gas spring is arranged inside the telescopic rod and is comprised of a thread tube with a thread on an outer wall, a piston, and a piston rod, wherein a distance between the piston rod and the inner tube remains constant, wherein the piston is located at a free end of the piston rod, wherein a seal guide assembly is provided between the piston rod and the thread tube, a nut, wherein the nut is adapted to the thread tube and is located at an end of the inner tube, a driving unit, and a tailgate connection assembly, wherein the tailgate connection assembly is located at two ends of the telescopic rod and is configured for connection between the telescopic rod and a tailgate, wherein there is no self-locking between the nut and the thread tube, wherein the nut serves to limit a circumferential position of the telescopic rod, wherein a circumferential movement between the outer tube and the inner tube is impossible, wherein an inner wall of the outer tube is provided with first grooves evenly distributed along an axis of the outer tube, wherein an outer wall of the inner tube is provided with second grooves evenly distributed along an axis of the inner tube, wherein an outer wall of the nut is provided with a first convex strip adapted to the first groove and a second convex strip adapted to the second groove.

2. The electric tailgate strut for the automobiles according to claim 1, wherein the driving unit comprises a motor, a gear box, wherein an output end of the motor drives the thread tube for the rotation through the gear box.

3. The electric tailgate strut for the automobiles according to claim 2, wherein the seal guide assembly comprises a spacer sleeve, and a rear upper sleeve, wherein the rear upper sleeve is fixedly connected to an end of the thread tube.

4. The electric tailgate strut for the automobiles according to claim 3, wherein the tailgate connection assembly is a ball socket or a ball head, wherein the tailgate connection assembly at least at one end of the telescopic rod is allowed to rotate in a circumferential direction.

5. The electric tailgate strut for the automobiles according to claim 1, wherein the end of the inner tube is provided with an inner tube plug, wherein the inner tube plug is connected to the free end of the piston rod, wherein a side wall of the inner tube plug is firmly connected to an inner wall of the inner tube.

6. The electric tailgate strut for the automobiles according to claim 5, wherein the seal guide assembly comprises a spacer sleeve, and a rear upper sleeve, wherein the rear upper sleeve is fixedly connected to an end of the thread tube.

7. The electric tailgate strut for the automobiles according to claim 6, wherein the tailgate connection assembly is a ball socket or a ball head, wherein the tailgate connection assembly at least at one end of the telescopic rod is allowed to rotate in a circumferential direction.

8. The electric tailgate strut for the automobiles according to claim 5, wherein a third convex strip is arranged on the side wall of the inner tube plug, wherein the third convex strip is adapted to the second groove.

9. The electric tailgate strut for the automobiles according to claim 8, wherein the seal guide assembly comprises a spacer sleeve, and a rear upper sleeve, wherein the rear upper sleeve is fixedly connected to an end of the thread tube.

10. The electric tailgate strut for the automobiles according to claim 8, wherein an outer tube plug is firmly installed at an end of the outer tube, wherein a power lead hole is preset on an end or a side of the outer tube plug, wherein a fourth convex strip is arranged on a side wall of the outer tube plug, wherein the fourth convex strip is allowed to be adapted to the first groove.

11. The electric tailgate strut for the automobiles according to claim 10, wherein the seal guide assembly comprises a spacer sleeve, and a rear upper sleeve, wherein the rear upper sleeve is fixedly connected to an end of the thread tube.

12. The electric tailgate strut for the automobiles according to claim 1, wherein the tailgate connection assembly is a ball socket or a ball head, wherein the tailgate connection assembly at least at one end of the telescopic rod is allowed to rotate in a circumferential direction.

13. The electric tailgate strut for the automobiles according to claim 12, wherein a protective cover comprises an outer tube protective cover arranged at an end of the outer tube and an inner tube protective cover arranged at the end of the inner tube.

14. The electric tailgate strut for the automobiles according to claim 1, wherein the seal guide assembly comprises a spacer sleeve, and a rear upper sleeve, wherein the rear upper sleeve is fixedly connected to an end of the thread tube.

15. The electric tailgate strut for the automobiles according to claim 14, wherein the tailgate connection assembly is a ball socket or a ball head, wherein the tailgate connection assembly at least at one end of the telescopic rod is allowed to rotate in a circumferential direction.

* * * * *